United States Patent Office 3,125,797
Patented Mar. 24, 1964

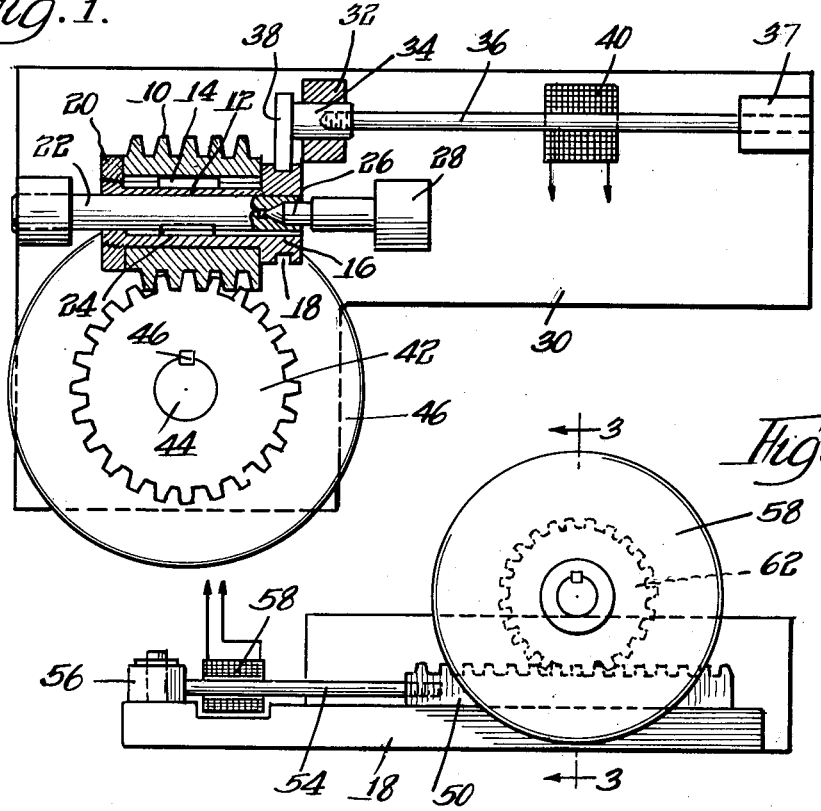
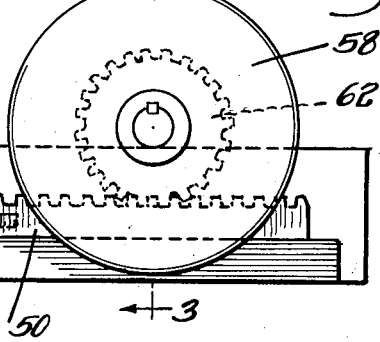
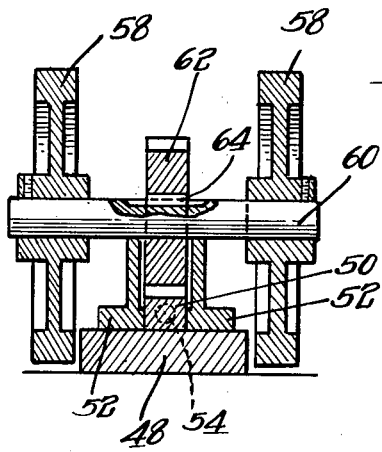

3,125,797
GEAR FINISHING MACHINE AND METHOD
Herbert O. Olson, 624 Dawson Ave., Rockford, Ill.
Original application May 26, 1954, Ser. No. 432,529, now Patent No. 2,952,067, dated Sept. 13, 1960. Divided and this application Aug. 11, 1960, Ser. No. 48,914
2 Claims. (Cl. 29—90)

This application is concerned with the forming of workpieces and more particularly with the finishing of toothed workpieces such as gears.

This application comprises a division of my copending application "Gear Finishing Machine and Method," Serial No. 432,529, filed May 26, 1954, now Patent No. 2,952,067, issued September 13, 1960.

Gears are conventionally cut from gear blanks by gear hobs which are constructed in accordance with any of a great number of formulae including cycloidal, involute, and others in accordance with the type of gear to be produced, and the use to which the gear is to be put. Gear hobs form the gears by cutting or scraping away the metal. All cutting or scraping away of metal, including gear hobbing, is essentially a tearing process. Thus, although a finished metal surface, such as a gear bearing surface, may appear to be quite smooth, it is actually rough. The surface may be seen with a microscope to be comprised of hills and valleys.

More specifically, the accuracy of tooth profile in gear hobbing is limited by at least three important factors. First, the hob usually has six gashes which provide the cutting edges on the leading side of each tooth. In the case of a single thread hob, six teeth cut for each gear tooth that is indexed. This causes the cutting edge to pass the cutting plane six times making six gouging gashes. Between each one of these six tooth cuts the gear is uniformly indexed. Therefore, approximately three gouges will show on each side of the tooth, starting at the top side of the working surface and ending at the lower edge. While this uniform indexing is taking place there will also be a feed increment equal to the feed in thousandths inches per revolution of hob divided by the number of gashes in the hob. This increment spaces the gouges made by the cone-like surface of the hob tooth of revolution. Between the gouges are the ridges formed by the intermittent gouges. The intermittency is caused by the spaces or voids between the hob teeth. Both the index and the feed increments continue to keep up their timed inter-relationship whether a cut is made or not. Obviously, a gouge can only be made when one of the six teeth reaches the maximum depth of the tooth cut. A hob with an unlimited number of teeth would generate a perfect involute, but it cannot be made.

Secondly, accuracy of tooth profile is impossible because of the tearing of metal fibers that is characteristic of all cutting tools. Even with the keenest of cutting edges considerable pressure is required to cause the edge to penetrate to the depth of the cut each time the tooth enters the metal. These pressure surges cause deflections of the arbor and consequent variations of cutting depth. Variations of hardness in various areas of the gear will cause varying deflections of the hob arbor and compression in the tooth being cut. Thus it may be seen that microscopic ripples are left on the working surface of the gear tooth, besides a maze of fibers not smoothly shorn from the gear blank. These cause errors of profile and roughness of surface which increase friction and consequent wear. This further leads to impacts in the mating gears which increase materially as the speed increases. These impacts not only cause stresses and wear, but also cause non-uniform rotation of the driven gear.

Added to this, the fibers on the tooth surface cause metal to metal contact between the teeth which through the interlacing effects destroy the lubrication film in transmission gears.

Commercially the hobbing process is not to be criticized for the quick removal of metal and the finishing of teeth to a certain level of perfection. To generate from this state toward a level of perfection, it is desirable to use a method that will shape the tooth profile in a manner that follows the definition of the true involute or other shape in accordance with the formula to which a gear is being formed.

Conventional cutting processes cannot generate continuously due to the limited number of cutting teeth that can remove the metal on the tooth working surfaces. The continuous rolling index action of the gear and the related feeding action of the cutting tool demand continuous cutting for pure generation. Intermittent cutting is the best that can be obained in hobbing, cutting or shaping of gear teeth in accordance with the teachings of the prior art. Thus it may be seen that cutting processes are limited in generative control.

In short, the microscopic hills and valleys present in even finely finished products resist relative sliding between mating bearing surfaces such as those in gears. This prevents smooth action of the gears and results in an appreciable power loss. Furthermore, it leads to short life of the gears as the hills and valleys of the mating surfaces tend to entangle and to tear pieces of metal from one another.

Accordingly, it is an object of this invention to provide an apparatus and method for finishing gears by means of a toothless hob.

It is another object of this invention to provide an apparatus and method for finishing worms and worm gears.

Yet another object of this invention is to provide an apparatus and method for finishing a gear and a mating rack.

Generally, it is an object of this invention to provide an apparatus and method for hammering the mating tooth bearing surfaces of a gear and an elongated toothed member tangent thereto.

Other and further objects and advantages of the present invention will be apparent from the following description when taken in connection with the accompanying drawings, wherein:

FIG. 1 is a plan view, partially in section, of a toothless hob finishing a gear, or a worm and gear being finished, in accordance with the principles of this invention;

FIG. 2 is an elevational view of an apparatus for finishing a gear and tangent rack; and FIG. 3 is a vertical sectional view as taken generally along the line 3—3 in FIG. 2.

This invention contemplates the provision of an apparatus and method for effecting what I like to call generative peening and compressive generation. In accordance with the principles of this invention, the bearing or working surfaces, generally comprising the faces and flanks, of a pair of mating gears are hammered together, or similar surfaces of a master and a gear are hammered together. Such hammering is effected very rapidly at frequencies up to several thousand per second and perhaps extending into supersonic frequencies, and each blow is of rather small magnitude.

The forces acting on the working or bearing surfaces of gears being finished in accordance with the principles of my invention are such as to cause ultimate compressive stresses on the small areas that actually contact after conventional hobbing. These areas are quickly increased until a smooth profile conforming substantially perfectly to an involute or other gear formula. These final areas are produced by millions of tiny hammer blows on the working surfaces of the teeth tangent to the base circle of the gear. Consequently, perfect generation results.

As shown in FIG. 1 a toothless vibratory hob 10 is mounted on a hob sleeve 12, being keyed thereto at 14. The hob sleeve is provided with a head 16 having an annular groove 18 therein. A nut 20 is threaded on the opposite end of the sleeve and clamps the toothless hob 10 against the head 16.

The sleeve 12 is slidably mounted on a hob spindle 22 and is fixed for rotation therewith by means such as a key 24. The hob spindle is supported at the left end for driving by any conventional mean (not shown), and the right end is supported by a center 26 extending from a support 28 on a massive base 30.

A slide bearing 32 is mounted on the base adjacent the sleeve head 16, and slidably supports a cylindrical slug or member 34 which is threaded or otherwise affixed to one end of a magnetostriction rod 36, the other end being anchored by a fixture 37 to the right end of the base 30. The fixture 37 and the slug 34 preferably are made of non-magnetic material. The slug 34 carries an arcuate yoke 38 (which may be integral with or fixed to the slug 34), and this yoke is provided with oppositely extending arms (not shown) which ride in the groove 18. A coil 40 encircles the magnetostriction rod 36 and is suitably connected to a source of electrical oscillations.

A gear 42 to be finish hobbed is supported on a shaft or arbor 44 and is keyed thereto at 46. The arbor is rotatably supported from the massive base 30, and a massive flywheel 46 is keyed to the shaft or arbor 44 beneath the gear 42 for damping oscillation of the gear 42. The hob spindle is rotated slowly by any suitable means, and this rotates the toothless hob 10 to drive the gear 42, the latter having been prehobbed in accordance with conventional gear hobbing practice. This causes the toothless hob to rub and press some of the high spots of the gear down. This is what I call impressive generation. The coil 40 is energized with high frequency electrical oscillations, and this causes the magnetostriction rod to shorten and elongate, thus acting through the yoke 38 and hob sleeve 12 to vibrate the hob 10, thereby hammering the working surfaces of the gear 42 to eliminate the high spots completely, thus effecting what I call generative peening. It will be apparent that the same apparatus and method could be applied in order simultaneously to finish a mating worm and worm wheel.

A rack and gear can also be finished in accordance with the invention, as shown in FIGS. 2 and 3. A massive base 48 is provided, and a rack 50 is slidably mounted thereon between a pair of parallels or rails 52. A magnetostriction rod 54 is threaded into or otherwise secured to one end of the rack 50, and the other end of this rod is anchored by means of a non-magnetic anchor 56 to the massive base 48. A coil 58 encircles the rod 54 and is provided with suitable wires leading to the amplifier or other source of electrical oscillations.

A pair of flywheels 58 is mounted on the opposite ends of a shaft or arbor 60 and is fixed for rotation therewith. The gear 62 to be finished is mounted on the shaft or arbor 60 and is fixed for rotation therewith by means such as a key 64, and the gear is arranged to mesh with the rack when the arbor is rolled along the rails or parallels 52.

Lengthening and shortening of the magnetostriction rod upon energization of the coil effects oscillatory motion of the rack 50 and causes the teeth of the rack to hammer against the teeth of the gear to finish the respective working surfaces thereof.

It is important to note that the hammering action normal to the working faces of the teeth causes flattening thereof without the cutting and tearing associated with conventional machining operations.

The particular embodiments of the invention as herein shown and described are for illustrative purposes only. Various changes in structure will no doubt occur to those skilled in the art, and such changes will be understood as forming a part of the invention insofar as they fall within the spirit and scope of the appended claims.

The invention is claimed as follows:

1. Apparatus for finishing gears comprising base means, first support means on said base means adapted to hold a toothed gear in position to be finished, said first support means having an axis, second support means on said base means spaced from the first support means and having an axis spaced from and disposed perpendicular to the first axis, said second support means being adapted to hold an elongated member appearing as a rack in axial section and having transverse projecting means in alignment with said second mentioned axis for meshing of a toothed gear and an elongated member, said first mentioned support being supported on said base means for rotation about said first mentioned axis to rotate a gear thereon about the support means axis of rotation, and oscillatory means acting between said base means and said second support means along said second mentioned axis to oscillate said second support means and an elongated member carried thereby while said first support means is being rotated about said axis of rotation whereby to hammer against one another the working surfaces of the teeth of a gear carried by said first support means and the projecting means of an elongated member carried by said second support means to produce a fine finish on at least some of said working surfaces.

2. The process for finishing gears which comprises supporting an elongated member appearing as a rack in axial section and having transverse projecting means, supporting a toothed gear in mesh with the projecting means of the elongated member with its axis transverse of the longitudinal direction of said elongated member, simultaneously rotating said gear about its own axis and oscillating said elongated member in its longitudinal direction to hammer against one another the working surfaces of the gear teeth and of the projecting means on the elongated member to produce a fine finish on at least some of said working surfaces.

References Cited in the file of this patent
UNITED STATES PATENTS

| | | |
|---|---|---|
| 1,032,974 | Weaver | July 16, 1912 |
| 1,154,830 | Alquist | Sept. 28, 1915 |
| 1,796,484 | Slade | Mar. 17, 1931 |
| 2,325,237 | Falk | July 27, 1943 |
| 2,641,088 | Wilcox | June 9, 1953 |
| 2,658,259 | Aldino | Nov. 10, 1953 |